(12) United States Patent
Gautier

(10) Patent No.: US 9,870,528 B2
(45) Date of Patent: Jan. 16, 2018

(54) METHOD FOR GENERATING AND DISPLAYING A SECURITY CODE FOR A PAYMENT CARD, PAYMENT CARD

(71) Applicant: CB INVESTISSEMENTS, Paris (FR)

(72) Inventor: Serge Gautier, Paris (FR)

(73) Assignee: CB INVESTISSEMENTS, Paris (FR)

( * ) Notice: Subject to any disclaimer, the term of this patent is extended or adjusted under 35 U.S.C. 154(b) by 0 days.

(21) Appl. No.: 14/947,034

(22) Filed: Nov. 20, 2015

(65) Prior Publication Data

US 2016/0148085 A1    May 26, 2016

(30) Foreign Application Priority Data

Nov. 21, 2014  (FR) ...................... 14 61296

(51) Int. Cl.
| | | |
|---|---|---|
| *G06K 19/06* | (2006.01) | |
| *G06K 19/077* | (2006.01) | |
| *G06K 19/073* | (2006.01) | |
| *G06Q 20/34* | (2012.01) | |
| *G06Q 20/38* | (2012.01) | |
| *G07F 7/08* | (2006.01) | |

(52) U.S. Cl.
CPC ..... *G06K 19/07707* (2013.01); *G06K 19/073* (2013.01); *G06Q 20/341* (2013.01); *G06Q 20/385* (2013.01); *G06Q 20/3825* (2013.01); *G07F 7/0846* (2013.01)

(58) Field of Classification Search
USPC ........................................ 235/492, 380, 379
See application file for complete search history.

(56) References Cited

U.S. PATENT DOCUMENTS

| | | | | |
|---|---|---|---|---|
| 5,627,355 A | * | 5/1997 | Rahman ................. | G06K 19/07 235/375 |
| 7,328,850 B2 | * | 2/2008 | Sines ................ | G06K 19/06187 235/487 |
| 7,784,687 B2 | * | 8/2010 | Mullen ............ | G06K 19/06206 235/380 |
| 7,853,529 B1 | * | 12/2010 | Walker ................... | G06Q 20/04 705/38 |
| 7,954,705 B2 | | 6/2011 | Mullen | |
| 8,777,116 B2 | * | 7/2014 | Lin ..................... | G06K 19/0701 235/379 |
| 2003/0105964 A1 | | 6/2003 | Brainard | |

(Continued)

FOREIGN PATENT DOCUMENTS

EP    0234100 A2    9/1987

OTHER PUBLICATIONS

French Search Report, dated Jun. 10, 2015 relating to FR1461296.

*Primary Examiner* — Ahshik Kim
(74) *Attorney, Agent, or Firm* — McDonnell Boehnen Hulbert & Berghoff LLP

(57) ABSTRACT

A payment card comprises a display device arranged on a face of the payment card, the display device comprising a field for displaying a security code for card verification operations carried out by a card verification server. The method comprises the operations of:
displaying, in the field of the display device, a first value of the security code during a first time period,
displaying, in the field of the display device, a second value of the security code during a second time period that follows the first time period, the first and second time periods being of different durations.

8 Claims, 2 Drawing Sheets

(56) References Cited

U.S. PATENT DOCUMENTS

2007/0136211 A1   6/2007  Brown
2009/0013390 A1*  1/2009  Li ........................... G06F 21/34
                                                              726/6
2012/0260324 A1  10/2012  Lenon

* cited by examiner

METHOD FOR GENERATING AND DISPLAYING A SECURITY CODE FOR A PAYMENT CARD, PAYMENT CARD

CROSS-REFERENCE TO RELATED APPLICATIONS

This application claims priority to French application No. FR 1461296 filed Nov. 21, 2014, the disclosure of which is hereby incorporated by reference in its entirety.

FIELD OF THE DISCLOSURE

The invention relates to a payment card equipped with a display device for displaying a security code for card verification operations, arranged on one side of the payment card, and a method for generating and displaying a security code for such a payment card.

The invention relates to the field of bank payment cards, for example EMV (Europay, Mastercard, Visa) or other types of cards.

BACKGROUND OF THE DISCLOSURE

A remote transaction with such a payment card, for example by internet, mail, fax, or telephone, usually involves providing a primary account number PAN written on one side of the payment card and some additional information, such as the expiration date of the payment card and/or the identity of the cardholder, written on the card.

In order to make remote transactions secure, it is usually also necessary to provide a card security code (CSC), also called a card verification value, which is used by the server for card verification operations. The security code is usually composed of 3 or 4 numbers written on the payment card, usually on the side of the card which is opposite the side bearing the primary account number PAN.

The numbers which compose the security code are determined for example by encrypting the primary account number PAN of the card, its expiration date, and a service code for the card, by a unique numeric key associated with the payment card, and keeping 3 or 4 digits of the result.

In this context, it is desirable to prevent the collection and/or reuse of security codes by unauthorized persons or agents who had access to the payment card information and have saved the primary account number PAN, the additional data, and the security code.

To this end, payment cards have been proposed that are provided with a display device for displaying a value of the security code, placed on one side of the payment card, in which the value of the security code is refreshed periodically to prevent or limit the reuse of the security code by unauthorized persons.

Document U.S. Pat. No. 7,954,705 shows an example of such a payment card and of a method for generating and displaying a security code for the payment card.

However, it is desirable to further improve the security of such payment cards, in particular so as to prevent or limit the possibility of reverse-engineering the payment card.

SUMMARY OF THE DISCLOSURE

The invention provides a method for generating and displaying a security code for a payment card comprising a display device arranged on a face of the payment card, the display device comprising a field for displaying a security code for card verification operations performed by a card verification server, the method comprising the steps of:
 displaying, in the field of the display device, a first value of the security code during a first time period,
 displaying, in the field of the display device, a second value of the security code during a second time period that follows the first time period, the first and second time periods being of different durations.

The security code is thus displayed on the card by electronic ink or some other type of display and is refreshed at calculated time intervals. The cardholder uses the current value of the security code in the same manner as the permanent unchangeable security code that is commonly used today.

The increased security arises from the rapid expiration of the captured numbers, which therefore must advantageously be rapid enough to disallow extensive use of the card but long enough to allow a user to easily obtain the security code.

In particular, if the user reads a first value of the security code on the card and then sends it to the card verification server while the card display has already switched to a second value of the security code, the card verification may fail.

To reduce the aggravation experienced by the card user, it can be arranged so that two values are accepted for the security code within a period of time around the moment of the change in value, these two values being in particular the first value and the second value which then succeed one another in time.

Said period of time around the moment of the change in value of the security code is therefore a period during which the probability of randomly generating an accepted security code is two times greater than outside this period. The method for generating and displaying a security code according to the invention makes it more difficult to identify this period of time by reverse engineering, because the moments of the change in value of the security code are not periodically consecutive.

In one embodiment, a switchover operation from the first time period to the second time period is carried out when a time counter exceeds a first switching threshold value associated with the first time period, the time counter being incremented by an internal clock of the payment card that is not synchronized with the card verification server.

In this manner, it is not possible to access synchronization information, indicating when the card will switch over, by intercepting exchanges between the card and the verification server.

This reinforces the security of the security code.

Preferably, the switchover operation from the first time period to the second time period comprises the steps of:
 incrementing a counter of displayed values of the security code,
 determining the second value of the security code to be displayed during the second time period based at least on a unique numeric key associated with the payment card and on the counter of displayed values of the security code,
 updating the display device of the card to display the second value of the security code, and
 determining a second switching threshold value associated with the second time period, based on at least the counter of displayed values of the security code.

In one advantageous embodiment, the values of the security code displayed in the field of the display device do not contain synchronization data for the card verification server.

In one particular embodiment, the method comprises a plurality of successive display operations, each display operation among the plurality of display operations including the displaying, in the field of the display device, of a security code value associated with said display operation during a time period associated with said display operation, and wherein the successive time periods associated with the successive display operations among the plurality of display operations form a calculable non-constant series.

Preferably, a switching threshold value associated with a time period is determined based on the counter of displayed values of the security code, on an average value of the time period between two switchovers, on a unique variability range associated with the payment card, and on a temporal value for the start of operation of the card.

Another aspect of the invention relates to a payment card comprising:

a display device arranged on a face of the payment card and comprising a field for displaying a security code for card verification operations performed by a card verification server, and a control circuit arranged to control the displaying, in said field of the display device, at least of a first value of the security code during a first time period and of a second value of the security code during a second time period that follows the first time period, the first and second time periods having different durations.

In one particular embodiment, the control circuit comprises:

a memory for storing a time counter and at least one switching threshold value, an internal clock that is not synchronized with outside the card, for incrementing the time counter, and a controlling circuit for switching from the first time period to the second time period when the time counter exceeds a first switching threshold value associated with the first time period.

In this case, the payment card preferably further comprises a primary account number PAN written on a face of the payment card.

Another aspect of the invention relates to a computer program for a payment card, the program comprising instructions for carrying out the steps of a method for generating and displaying a security code for card verification operations as described above.

BRIEF DESCRIPTION OF THE DRAWINGS

Other features and advantages of the invention will be apparent from the following description of some non-limiting exemplary embodiments, with reference to the accompanying drawings, in which.

DETAILED DESCRIPTION OF THE DISCLOSURE

The invention is described below in its non-limiting application to remote transactions using an EMV (Europay, Mastercard, Visa) card.

Figure 1:
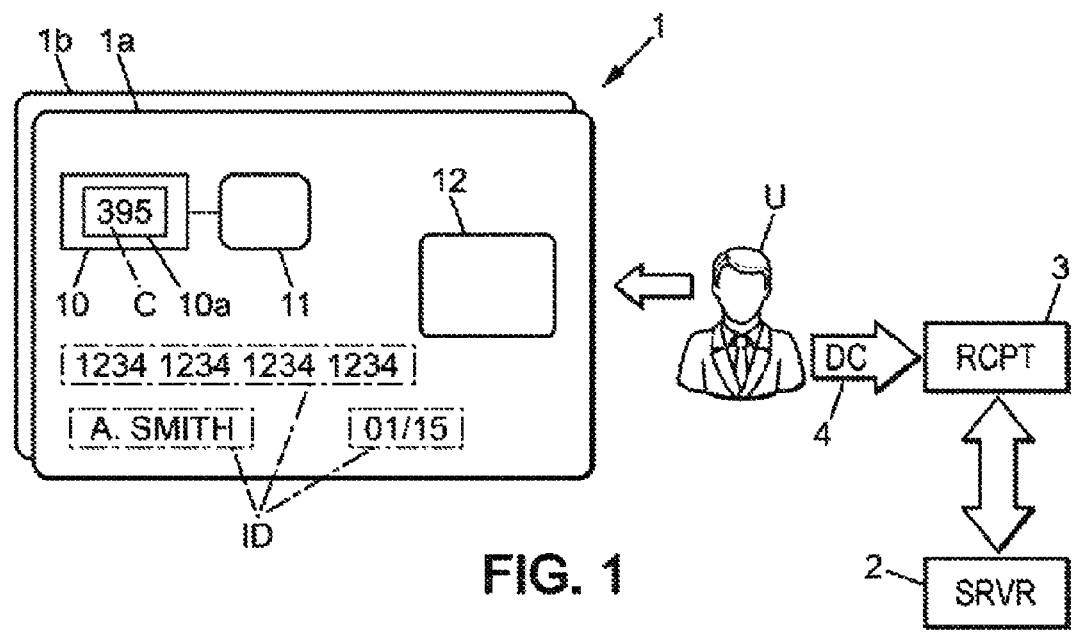
FIG. 1 is a summary diagram of a payment card verification system comprising a payment card according to the invention, as well as a card verification server and a receiving entity.
Figure 2:
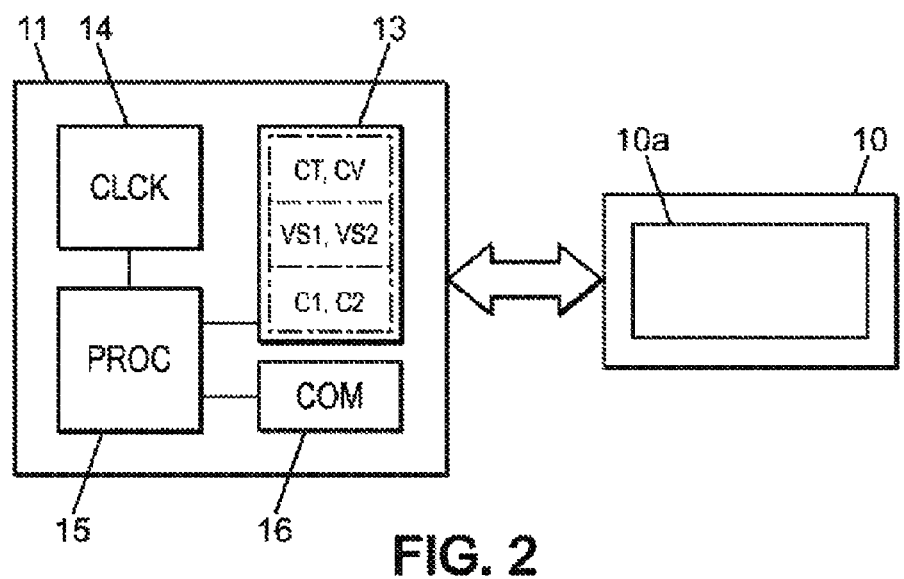
FIG. 2 is a detailed block diagram of the payment card of FIG. 1.

Entity 1 represented in FIG. 1 is a payment card 1, for example an EMV (Europay, Mastercard, Visa) card.

Entity 2 is a card verification server which comprises at least one card data entry unit 20 and a processing unit 21.

Entity 3 is a receiving entity 3 with which a user U of the payment card 1 can communicate via a communication channel 4, for example by internet, mail, fax, or telephone, during a remote transaction with a payment card.

The receiving entity 3 can thus for example be a server of an internet retailer website or an internet online payment site or a provider receiving a transaction request by mail, fax, or telephone. The receiving entity 3 is therefore adapted to receive card data DC from a user U of the payment card 1, via various communication channels 4. The receiving entity 3 is further adapted to send the data to the card verification server 2 via a second communication channel 5, for example over a network such as the Internet, an intranet, or a point-to-point wired or wireless connection.

The receiving entity 3 thus mediates between the user U of the payment card 1 and the card verification server 2.

The card data DC comprise a security code value C to be tested from the payment card 1, and identification information ID of said payment card, for example a primary account number PAN of the payment card, an expiration date of the payment card, and/or the identity of the cardholder of the payment card.

The card verification server 2 is suitable and intended for implementing card verification operations which include:

an operation of receiving card data by the entry unit 20.

an operation of determining an acceptable security code value, by means of the processing unit 21. The acceptable security code value may in particular be determined from identification information included in the card data, for example from a primary account number PAN, an expiration date of the payment card, and/or the identity of the cardholder of the payment card. The acceptable security code value is determined without using the security code value to be tested included in the card data.

an operation of comparing the security code value to be tested and the acceptable security code value, to determine whether the card data are accepted.

During the operation of determining an acceptable security code value, the card verification server 2 may fetch additional information about the payment card from a database 3. This additional information may be, for example, seed values for an algorithm that calculates security code values as detailed below. The acceptable security code value is then determined based on the identification information included in the card data and on additional information obtained from the database 3.

Said database 3 may associate said additional information with payment card identification information, such as primary account numbers PAN, so as to facilitate access to said additional information.

Of course, the card verification operations may include additional operations not mentioned here, for example verification of payment card identification information, for example verification of the primary account number PAN of the payment card, of the expiration date of the payment card, and/or of the identity of the cardholder of the payment card.

The card verification operations allow deciding, in general, to the extent possible, whether the payment card is actually in the possession of the user U requesting the remote transaction.

The payment card 1 is a card of known format, for example as defined in ISO 7810 ID-1, ISO 7813, meaning it has, for example, the general shape of an easily carried semi-rigid sheet of a thickness for example of a few millimeters and measuring several centimeters per side, for example at least partially composed of plastic.

It comprises two opposite faces 1a and 1b. At least one of these faces 1b may provide certain information, particularly payment card identification information ID such as a primary account number PAN of the payment card, an expiration date of the payment card, and/or the identity of the cardholder of the payment card.

The payment card 1 also comprises a display device 10.

The display device 10 is provided on a face 1a of the payment card 1. The display device 10 includes a field 10a for displaying a security code. The display device 10 is arranged on a face 1a of the card such that the field 10a is visible to a user of the payment card 1.

The display device 10 may be arranged on the same face as some of the payment card identification information. Or the display device 10 may be arranged on one face 1a while the payment card identification information is arranged on the opposite face 1b, so that it is impossible to see both the security code and the payment card identification information at the same time. This reduces the risk of fraud.

In one embodiment which allows the reuse of existing communication channels, the values of the security code displayed in the field 10a of the display device 10 each comprise 3 or 4 digits.

The payment card 1 also comprises a control circuit 11 arranged to control the displaying 200, in the field 10a of the display device 10, of a security code value that can be used for card verification operations performed by a card verification server, as described above.

Thus, in a remote transaction with such a payment card 1, for example by internet, mail, fax, or telephone, the user U of the card can read, on the payment card 1, the card data as detailed above, meaning data comprising for example the security code value to be tested, the primary account number PAN of the payment card, the expiration date of the payment card, and/or the identity of the cardholder of the payment card, and can provide these data to the receiving entity 3 via the appropriate channel (depending on the embodiment: by entering data into the fields of a web page or computer program, written or oral communication by letter, fax, or telephone) which transmits them to the card verification server 2 to determine whether the data are accepted and whether the transaction can be authorized.

In one embodiment, the receiving entity 3 can be the card verification server 2 directly.

The payment card 1 may also include a chip 10 capable of communicating with a terminal electrically or without contact, in particular a payment terminal, in order to carry out for example direct payment transactions as are practiced with conventional payment cards. The control circuit 11 may be integrated into the chip 12 or may be a circuit physically separate from said chip 12.

Obviously, in such direct payment transactions, the card provider and the merchant (machine or person) are physically present and in proximity to each other. The merchant is usually able to confirm, visually or by contact or detection, that the payment card is actually in the possession of the user requesting the transaction. The invention is interested in remote transactions in which this physical presence is usually not verified.

More specifically, the control circuit 11 is arranged to control the displaying 200, in the field 10a of the display device 10, at least of a first value of the security code C1 during a first time period T1 and of a second value of the security code C2 during a second time period T2 that follows the first time period T1.

Figure 3:
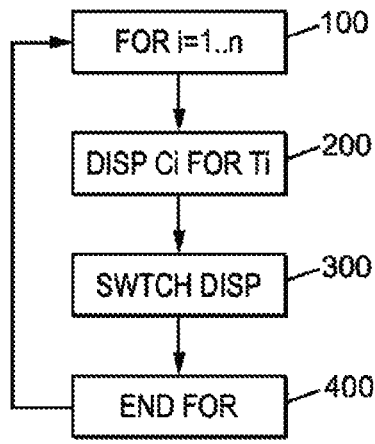
FIG. 3 is a flowchart of operations for generating and displaying a security code for a payment card such as the one of FIGS. 1 and 2.

FIG. 3 illustrates an embodiment of such a method, wherein a loop 100, 200, 300, 400 successively displays different values of the security code. A switchover operation 300 allows switching the display from one value of the security code to another value of the security code.

The flowchart shown in FIG. 3 is a typical example of a program of which some instructions can be executed on the equipment described. As such, FIG. 3 can correspond to the flowchart for the general algorithm of a computer program within the meaning of the invention.

It is understood that at a given moment, the field 10a displays a unique security code value from among the values C1 and C2. However, this displayed unique value is able to change over time. In one embodiment of the invention, the field 10a is in particular adapted to display only one security code value at a given moment and is not able to display multiple security code values simultaneously. In this manner, the dimensions and power consumption of the display device 10 are reduced.

For this purpose, the control circuit 11 may in particular comprise a memory 13 and an internal clock 14.

The memory 13 is adapted to contain a time counter CT and at least one switching threshold value VS1.

The internal clock 14 is adapted to increment said time counter TC at regular time intervals. Advantageously, the internal clock 14 is not synchronized with outside the payment card 1, in particular is not synchronized with the card verification server 2. This makes it more difficult to predict the moment of switching between different security code values, and the risk of fraud is reduced.

For this purpose for example, the security code values displayed in the field 10a of the display device 10 do not comprise synchronization data.

The control circuit 11 may further comprise a controlling circuit 15 and a communication circuit 16 for communicating with the display device 10.

The controlling circuit 15 can communicate with the internal clock 14, the memory 13, and the communication circuit 16.

In one particular embodiment of the invention, the control circuit 11 may be integrated with the display device 10.

In another embodiment, the control circuit 11 and the display device 10 may be physically separate and form two separate chips.

The control circuit 11 and/or controlling circuit 15 may be, for example:
  a processor adapted to interpret instructions in the form of a computer program, or
  a microchip, in particular a chip in which the steps of the method of the invention are defined in the silicon, or
  a programmable microchip.

Figure 4:
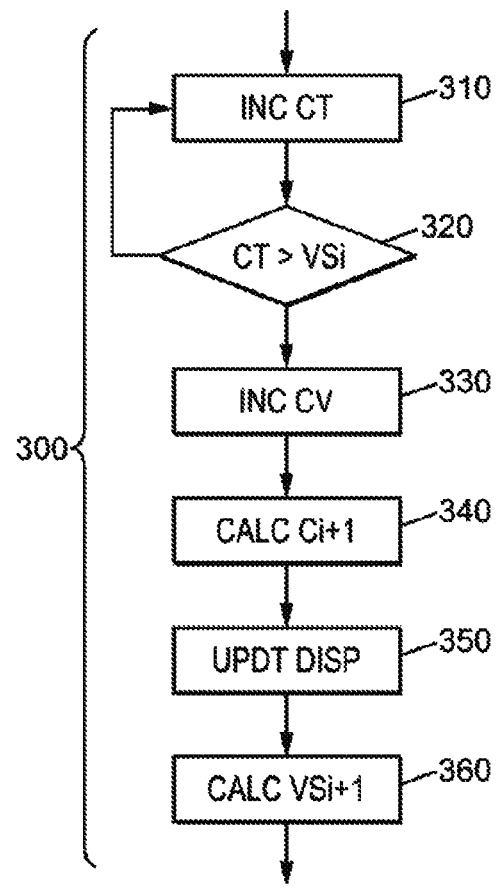
FIG. 4 is a detailed flowchart of a switchover operation carried out during a method for generating and displaying a security code according to the invention.

FIG. 4 more specifically describes the sub-steps that may be included in the switchover operation 300.

As can be seen in FIGS. 3 and 4, the controlling circuit 15 is able to implement at least one switchover operation 300 from the first time period T1 to the second time period T2. This switchover operation 300 may in particular be carried out when the time counter TC exceeds a switching threshold value VS1. The switching threshold value VS1 may be a first switching threshold value VS1 associated with the first time period T1.

For example, the time counter CT is regularly incremented 310 by the internal clock 14 of the control circuit 11, and when said time counter CT exceeds a threshold value defined for each time period 320, a new value of the security code is displayed 350 in the field 10a of the display device 10. In one embodiment, the time counter CT can then be reset or a new threshold value may be determined while taking into account the value already in the time counter CT.

More specifically, the switchover operation from the first time period T1 to the second time period T2 may comprise at least the steps of:
- incrementing 330 a counter of displayed values of the security code CV, which in this case therefore contains the index i of the second time period, meaning the value 2,
- determining 340 the second value of the security code C2 to be displayed during the second time period T2, based at least on a unique numeric key M associated with the payment card 1 and on the counter of displayed values of the security code CV,
- updating 350 the display device 10 of the card to show the second value of the security code C2, and
- determining 360 a second switching threshold value VS2 associated with the second time period T2, based on at least the counter of displayed values of the security code CV.

One can see that such an algorithm easily allows for first and second time periods T1, T2 of different durations.

In one exemplary embodiment, the time counter CT can be reset during an additional step in the switchover operation.

These steps 310, 320, 330, 340, 350, 360 may be carried out in succession in the above sequence. In one possible variant of the invention, the above steps may be performed in a different order than what is indicated or even in parallel for some or all of these steps.

Finally, the different values of the security code can be determined by any calculation method that allows obtaining successive calculable values, said calculation method advantageously being difficult or impossible to reverse. For example, an algorithm can be used that is similar to known security code calculation algorithms, for example such as those defined in the EMV (Europay, Mastercard, Visa) specifications.

Such an algorithm calculates a security code value using a unique numeric key M associated with the payment card 1, and possibly card data as detailed above, in other words for example the security code value to be tested, the primary account number PAN of the payment card, the expiration date of the payment card, and/or the identity of the cardholder of the payment card.

To obtain successive security code values it is then sufficient to consider for example the counter of displayed values of the security code CV. A portion of the input values of said algorithm can be replaced by the value of the counter of displayed values of the security code CV, for example a portion of said unique numeric key M associated with the payment card 1, or a portion of said card data.

This example of a method for calculating the security code is obviously provided for informational and non-limiting purposes, and variants for calculating such a series of successive security code values are of course conceivable.

It is understood that the method is particularly suitable for the case where there is a plurality of n successive display operations 200, as illustrated in FIG. 3.

In this case, each display operation i among the plurality of display operations then comprises the displaying, in the field 10a of the display device 10, of a security code value Ci associated with said display operation i for a period of time Ti that is also associated with said display operation i.

Of course, in this case the counter of displayed values of the security code CV will contain for example each successive value of the index i of the time periods, meaning the successive values from 1 to n.

The counter of displayed values of the security code CV therefore allows storing the index i of the security code value currently displayed. For better understanding of the invention, the index i will be used in the present description to refer to the index of the currently displayed value of the security code while keeping in mind that in practice said value is contained in variable CV which is updated as the method according to the invention is carried out.

As will now be detailed, the successive time periods T1, . . . , Tn associated with the successive display operations among the plurality of display operations, can form a calculable non-constant series.

"Non-constant series" is understood to mean that at least two time periods Ti, Tj, among the plurality of successive time periods T1, . . . , Tn, have durations that differ from each other. In other words, this means that the switching of the display device 10 is not periodic in time.

Advantageously, a majority of the successive time periods T1, . . . , Tn may be distinct from each other, or even all of the successive periods of time T1, . . . , Tn, may be different from each other, with no time period T1, . . . , Tn having the same duration as another time period T1, . . . , Tn.

"Calculable series" is understood to mean that the sequence of successive time periods T1, . . . , Tn is predictable and can be calculated from a set of predefined and known data, for example from the manufacturer of the payment card.

In particular, it is not possible for the card verification server 2 to verify the value currently displayed in the security code without having to exchange synchronization information with the payment card 1.

Said set of predefined and known data may comprise the primary account number PAN, the expiration date of the payment card, and/or the identity of the cardholder of the payment card, but may also comprise seed values for an algorithm for calculating security code values as will now be detailed in one particular embodiment of a method according to the invention.

For example, one can determine a variation TVARi associated with a time period Ti, for example as follows, as a function of the counter of displayed values of the security code CV, which in this example is i, and of a unique variability range associated with the payment card PVAR:

$$TVAR_i = i^2 \bmod PVAR$$

A switching threshold value VSi associated with a time period Ti can then be determined based on the variation TVARi associated with the time period Ti and on an average value for the time period between two switchovers VSm and a temporal value of the start of operation of the card T0, for example:

$$VS_i = T0 + i*VSm + TVAR_i$$

In this manner, the switching threshold value VSi associated with the time period Ti is determined and can be calculated without synchronization by the card and the server.

Advantageously, the variation between successive switching threshold values VSi is itself non-periodic, or in other words the variation in the duration of the sequence of successive time periods T1, . . . , Tn is non-periodic and therefore not easily predictable.

Note that this goes beyond a simple non-periodicity of the switchover times of the display device 10, since it is the absence of periodicity (meaning the variation between successive time periods Ti, Ti+1), which itself is non-periodic.

In this particular embodiment, the seed values are thus the average value of the time period between two switchovers VSm, the unique variability range associated with the payment card PVAR, and the temporal value of the start of operation of the card T0.

One can therefore see that these seed values are easily shared between the payment card 1 and the card verification server 2, for example during or immediately after the manufacture of the payment card 1.

In addition, the series of switching threshold values VSi associated with a time period Ti is then a calculable non-constant series. Therefore, the series of successive time periods Ti, associated with the successive display operations i among the plurality of display operations, also forms a calculable non-constant series.

The various seed values are chosen to ensure sufficient variability in the series of successive time periods Ti to reduce the risk of fraud while maintaining ease of use by the operator, meaning to ensure sufficient time in displaying each value of the security code to allow the user to read and use it at a normal speed.

Of course, it is understood that the above equations for determining the switching threshold value VSi associated with a time period Ti are provided only by way of example.

Thus one can consider modifying the exact form of these equations and using additional seed values such as a defined time increment for example, to ensure a minimum display time for each value of the security code.

Of course, the invention is not limited to the embodiments described above as examples; it extends to other variants.

Other embodiments are possible.

What is claimed is:

1. A method for generating and displaying a security code for a payment card comprising a display device arranged on a face of the payment card, the display device comprising a field for displaying a security code for card verification operations performed by a card verification server, the method comprising the steps of:
    displaying, in the field of the display device, a first value of the security code during a first time period,
    displaying, in the field of the display device, a second value of the security code during a second time period that follows the first time period, the first and second time periods being of different durations,
    wherein a switchover operation from the first time period to the second time period is carried out when a time counter exceeds a first switching threshold value associated with the first time period, the time counter being incremented by an internal clock of the payment card that is not synchronized with the card verification server.

2. The method according to claim 1, wherein the switchover operation from the first time period to the second time period comprises the steps of:
    incrementing a counter of displayed values of the security code,
    determining the second value of the security code to be displayed during the second time period based at least on a unique numeric key associated with the payment card and on the counter of displayed values of the security code,
    updating the display device of the card to display the second value of the security code, and
    determining a second switching threshold value associated with the second time period, based on at least the counter of displayed values of the security code.

3. The method according to claim 1, wherein the values of the security code displayed in the field of the display device do not contain synchronization data for the card verification server.

4. The method according to claim 1, comprising a plurality of successive display operations,
    each display operation, among of the plurality of display operations, including the display, in the field of the display device, of a value of the security code associated with said display operation during a time period associated with said display operation,
    and wherein the successive time periods associated with the successive display operations among the plurality of display operations form a calculable non-constant series.

5. The method according to claim 1, wherein a switching threshold value associated with a time period is determined based on the counter of displayed values of the security code, on an average value of the time period between two switchovers, on a unique variability range associated with the payment card, and on a temporal value for the start of operation of the card.

6. A payment card comprising
    a display device arranged on a face of the payment card, comprising a field for displaying a security code for card verification operations performed by a card verification server, and
    a control circuit arranged to control the displaying, in said field of the display device, at least of a first value of the security code during a first time period and of a second value of the security code during a second time period that follows the first time period, the first and second time periods having different durations,
    wherein the control circuit comprises:
    a memory for storing a time counter and at least one switching threshold value,
    an internal clock that is not synchronized with outside the card, for incrementing the time counter, and
    a processing circuit for switching from the first time period to the second time period when the time counter exceeds a first switching threshold value associated with the first time period.

7. The payment card according to claim 6, further comprising a primary account number PAN written on a face of the payment card.

8. A non-transitory computer readable storage medium, having stored thereon a computer program for a payment card, said program comprising instructions for carrying out the steps of a method for generating and displaying a security code for a payment card comprising a display device arranged on a face of the payment card, the display device comprising a field for displaying a security code for card verification operations performed by a card verification server, the method comprising the steps of:

displaying, in the field of the display device, a first value of the security code during a first time period, displaying, in the field of the display device, a second value of the security code during a second time period that follows the first time period, the first and second time periods being of different durations, wherein a switchover operation from the first time period to the second time period is carried out when a time counter exceeds a first switching threshold value associated with the first time period, the time counter being incremented by an internal dock of the payment card that is not synchronized with the card verification server.

\* \* \* \* \*